(12) United States Patent
Nakayama et al.

(10) Patent No.: US 10,371,404 B2
(45) Date of Patent: Aug. 6, 2019

(54) RECEIVER AND AIR-CONDITIONING DEVICE EQUIPPED WITH SAME

(71) Applicant: DAIKIN INDUSTRIES, LTD., Osaka-shi, Osaka (JP)

(72) Inventors: Toshimichi Nakayama, Osaka (JP); Yoshiteru Nouchi, Osaka (JP); Kousuke Shiohama, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/073,227

(22) PCT Filed: Jan. 18, 2017

(86) PCT No.: PCT/JP2017/001494
§ 371 (c)(1),
(2) Date: Jul. 26, 2018

(87) PCT Pub. No.: WO2017/145583
PCT Pub. Date: Aug. 31, 2017

(65) Prior Publication Data
US 2019/0063775 A1  Feb. 28, 2019

(30) Foreign Application Priority Data

Feb. 22, 2016 (JP) .................................. 2016-031431

(51) Int. Cl.
*F24F 11/56* (2018.01)
*F24F 11/89* (2018.01)
(Continued)

(52) U.S. Cl.
CPC .............. *F24F 11/56* (2018.01); *F24F 11/88* (2018.01); *F24F 11/89* (2018.01); *F24F 2110/10* (2018.01); *F24F 2110/12* (2018.01)

(58) Field of Classification Search
CPC .. F24F 11/56; F24F 11/88; F24F 11/89; F24F 2110/10; F24F 2110/12
See application file for complete search history.

(56) References Cited

U.S. PATENT DOCUMENTS

2012/0214398 A1  8/2012 Nouchi
2018/0195755 A1*  7/2018 Nishida ................. G06Q 50/00
(Continued)

FOREIGN PATENT DOCUMENTS

JP        02-133740 A      5/1990
JP     2008-286460 A     11/2008
(Continued)

OTHER PUBLICATIONS

International Search Report for PCT/JP2017/001494 (PCT/ISA/210) dated Apr. 18, 2017.

*Primary Examiner* — Marc E Norman
(74) *Attorney, Agent, or Firm* — Birch, Stewart, Kolasch & Birch, LLP (57) ABSTRACT

A receiver unit includes: a receiving section receiving a signal of a measurement value (Tm2) transmitted from a wireless temperature sensor unit; an input connector connected to a sensor signal line, the sensor signal line being configured to transfer a signal of a measurement value (Tm1) of the suction air temperature sensor; a signal generator generating a signal serving as an index of indoor temperature, based on the measurement values (Tm1, Tm2) of the wireless temperature sensor unit and the suction air temperature sensor; and a signal output section outputting the signal generated by the signal generator to a controller of an air-conditioning device.

3 Claims, 5 Drawing Sheets

(51) Int. Cl.
*F24F 11/88* (2018.01)
*F24F 110/10* (2018.01)
*F24F 110/12* (2018.01)

(56) References Cited

U.S. PATENT DOCUMENTS

2018/0252429 A1* 9/2018 Kojima .................... F24F 11/89
2018/0283716 A1* 10/2018 Ribbich ................... F24F 11/30
2019/0032980 A1* 1/2019 Nakayama ............... F24F 11/89

FOREIGN PATENT DOCUMENTS

| JP | 2011-099612 A | 5/2011 |
| JP | 2011-174702 A | 9/2011 |
| JP | 2014-077598 A | 5/2014 |
| JP | 2014-137161 A | 7/2014 |
| WO | WO 2014/091541 A1 | 6/2014 |

* cited by examiner

RECEIVER AND AIR-CONDITIONING DEVICE EQUIPPED WITH SAME

TECHNICAL FIELD

The present invention relates to a receiver and an air-conditioning device including the same.

BACKGROUND ART

An air-conditioning device conditioning air in an indoor space has been known [[(see, for example, Patent Document 1)]]. The air-conditioning device includes an outdoor unit and an indoor unit which are connected together through pipes. Operation of the air-conditioning device is controlled by a controller. Patent Document 2 discloses the provision of a suction air temperature sensor that is used to measure the temperature of air taken into the indoor unit.

CITATION LIST

Patent Document

Patent Document 1: Japanese Unexamined Patent Publication No. 2011-099612
Patent Document 2: Japanese Unexamined Patent Publication No. 2014-137161

SUMMARY OF THE INVENTION

Technical Problem

In addition to the suction air temperature sensor, an ambient temperature sensor that measures an ambient temperature may be provided at an optional location in an indoor space to obtain information on the air temperature at the optional location. In this case, in order to be able to be installed at an optional location, the ambient temperature sensor suitably forms a portable wireless temperature sensor unit together with a transmitter capable of transmitting a signal of the measured value by radio.

Here, even if a measurement value of the wireless temperature sensor unit is used to control operation of the air-conditioning device, there is sometimes a need for using, for the same purpose, a measurement value of the suction air temperature sensor that has already been included in the indoor unit. For example, when the measurement value of the wireless temperature sensor unit is abnormal, or when no signal can be received from the wireless temperature sensor unit, the measurement value of the suction air temperature sensor needs to be used to control the operation of the air-conditioning device. However, an existing controller is typically configured to use only the measurement value of the suction air temperature sensor as an index of room temperature. That is to say, the existing controller is typically designed on the precondition that it receives only one index of room temperature. That is why a new controller having a different configuration from that of the existing controller needs to be made so that both of the wireless temperature sensor unit and the suction air temperature sensor are used to control the operation of the air-conditioning device. This may complicate a process for manufacturing an air-conditioning device and may increase manufacturing cost of such an air-conditioning device.

In view of the foregoing background, it is an object of the present invention to provide a receiver that can use both of a wireless temperature sensor unit and a suction air temperature sensor to control operation of an air-conditioning device, without changing the configuration of an existing controller designed on the precondition that the controller receives only one index of room temperature.

Solution to the Problem

A first aspect of the present disclosure is directed to a receiver (63) for an air-conditioning device. The receiver is provided for an indoor unit (12) of the air-conditioning device (10), and includes: a receiving section (63a) receiving a signal of a measurement value (Tm2) transmitted from a wireless temperature sensor unit (13) by radio, the wireless temperature sensor unit (13) measuring an ambient temperature and being separate from the indoor unit (12); an input connector (63d) connected to a sensor signal line (62), the sensor signal line (62) being configured to transfer a signal of a measurement value (Tm1) of a suction air temperature sensor (61), the suction air temperature sensor (61) measuring a temperature of indoor air drawn into the indoor unit (12); a signal generator (63c) generating a signal serving as an index of indoor temperature, based on the measurement values (Tm1, Tm2) of the wireless temperature sensor unit (13) and the suction air temperature sensor (61); and a signal output section (63e, 64) outputting the signal generated by the signal generator (63c) to a controller (28, 66) of the air-conditioning device (10).

According to the first aspect, the measurement value (Tm2) of the wireless temperature sensor unit (13) and the measurement value (Tm1) of the suction air temperature sensor (61) are both fed to the receiver (63). Then, the signal generator (63c) of the receiver (63) generates the signal serving as the index of indoor temperature, based on both of the fed measurement values (Tm1, Tm2). Then, the signal output section (63e, 64) outputs the generated single signal to the controller (28, 66) of the air-conditioning device (10). Specifically, two signals of the measurement value (Tm2) of the wireless temperature sensor unit (13) and the measurement value (Tm1) of the suction air temperature sensor (61) are not fed to the controller (28, 66). What is fed to the controller (28, 66) is only the single signal generated by the signal generator (63c). Thus, both of the wireless temperature sensor unit (13) and the suction air temperature sensor (61) can be used to control operation of the air-conditioning device (10) without changing the configuration of the existing controller (28, 66) designed on the precondition that the controller (28, 66) receives only one index of indoor temperature.

A second aspect of the present disclosure is directed to an air-conditioning device. The air-conditioning device includes: the receiver (63) of claim 1; the controller (28, 66) receiving the signal generated by the signal generator (63c) and performing a control operation using the received signal; and a component (21, 27) controlled by the control operation of the controller (28, 66).

According to the second aspect, the controller (28, 66) controls the component (21, 27) using the single signal generated by the signal generator (63c), based on the measurement value (Tm2) of the wireless temperature sensor unit (13) and the measurement value (Tm1) of the suction air temperature sensor (61). Thus, both of the wireless temperature sensor unit (13) and the suction air temperature sensor (61) can be used to control operation of the air-conditioning device (10) without changing the configuration of the existing controller (28, 66) designed on the precondition that the controller (28, 66) receives only one index of indoor temperature.

A third aspect of the present disclosure is an embodiment of the second aspect. In the third aspect, the controller (28, 66) includes a common input connector (66a) having a shape identical to that of the input connector (63d), the common input connector (66a) being connectable to a selected one of the signal output section (63e, 64) and the sensor signal line (62).

According to the third aspect, if the signal output section (63e, 64) of the receiver (63) is connected to the common input connector (66a), the controller (28, 66) can use both of the measurement value (Tm2) of the wireless temperature sensor unit (13) and the measurement value (Tm1) of the suction air temperature sensor (61) to control the component (21, 27). On the other hand, if the sensor signal line (62) extending from the suction air temperature sensor (61) is connected to the common input connector (66a), the controller (28, 66) uses not the measurement value (Tm2) of the wireless temperature sensor unit (13) but only the measurement value (Tm1) of the suction air temperature sensor (61) to control the component (21, 27).

Advantages of the Invention

According to an aspect of the present disclosure, both of a wireless temperature sensor unit (13) and a suction air temperature sensor (61) can be used to control operation of an air-conditioning device (10) without changing the configuration of an existing controller (28, 66) designed on the precondition that the controller (28, 66) receives only one index of indoor temperature.

DESCRIPTION OF EMBODIMENTS

Embodiments of the present invention will be described in detail with reference to the drawings. The embodiment described below is merely an exemplary one in nature, and is not intended to limit the scope, applications, or use of the invention.

—Configuration of Air-Conditioning Device—

Figure 1:
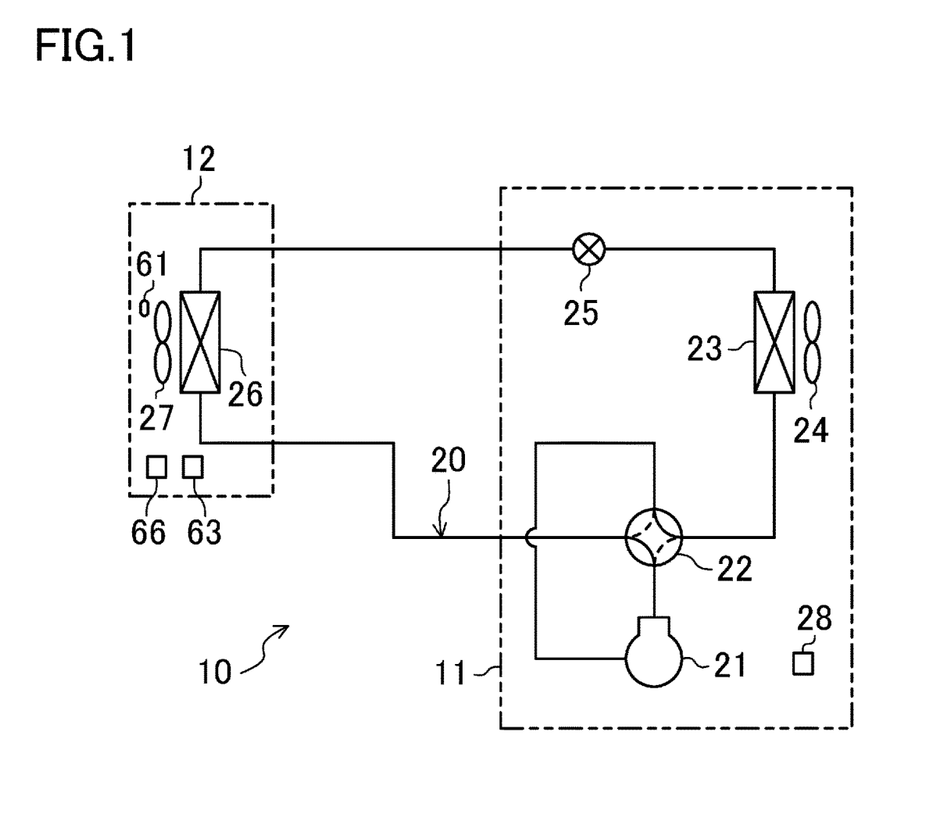
FIG. 1 is a refrigerant circuit diagram showing a general configuration of an air-conditioning device according to an embodiment.
Figure 2:
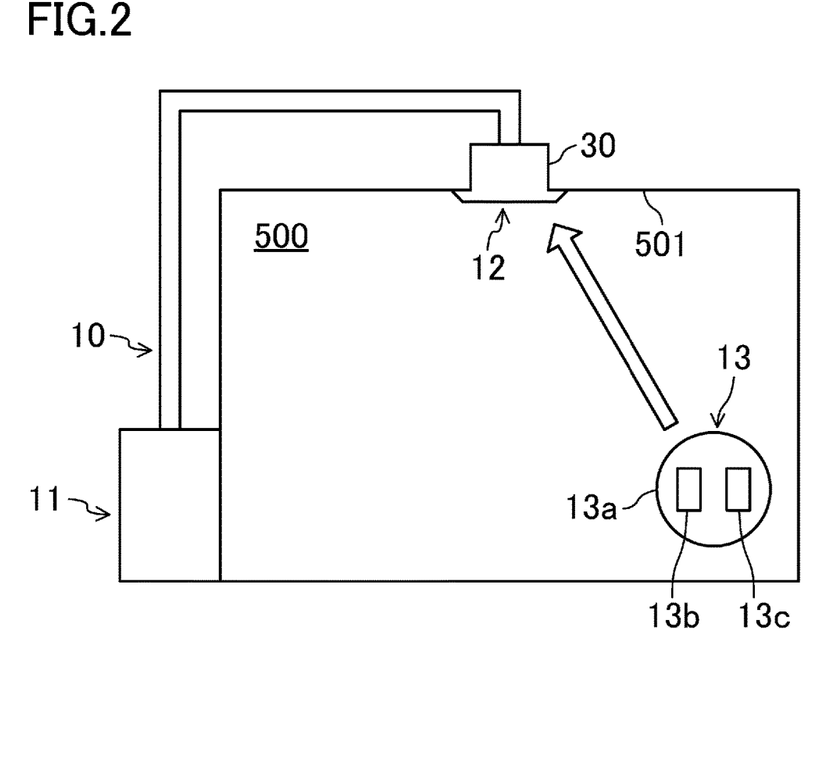
FIG. 2 schematically shows how the air-conditioning device of the embodiment is installed.

As shown in FIGS. 1 and 2, an air-conditioning device (10) of this embodiment includes an outdoor unit (11), an indoor unit (12), and a wireless temperature sensor unit (13). The outdoor unit (11) and the indoor unit (12) are connected together through pipes to form a refrigerant circuit (20), which performs a vapor compression refrigeration cycle.

The outdoor unit (11) includes a compressor (21), a four-way switching valve (22), an outdoor heat exchanger (23), an outdoor fan (24), an expansion valve (25), and an outdoor controller (28). The outdoor unit (11) is disposed outdoors as shown in FIG. 2. The air-conditioning device (10) is configured such that switching the four-way switching valve (22) allows the direction of flow of a refrigerant in the refrigerant circuit (20) to be changed reversibly.

The indoor unit (12) includes an indoor heat exchanger (26) and an indoor fan (27). As shown in FIG. 2, the indoor unit (12) is embedded in an opening of an indoor ceiling. That is to say, the indoor unit (12) of this embodiment is configured as a so-called ceiling-embedded indoor unit. A configuration of the indoor unit (12) will be described below in detail. The compressor (21) and the indoor fan (27) constitute components.

The wireless temperature sensor unit (13) is portable, and can be installed at an optional location in an indoor space (500) (e.g., near a person present in the indoor space (500)) as shown in FIG. 2. The wireless temperature sensor unit (13) includes a unit case (13a), an ambient temperature sensor (13b), and a transmitter (13c). The ambient temperature sensor (13b) is disposed in the unit case (13a) to measure an ambient temperature. The transmitter (13c) is disposed in the unit case (13a) to transmit, by radio, a signal of a measurement value (Tm2) of the ambient temperature sensor (13b) to a receiver unit (63) described below.

The transmitter (13c) of the wireless temperature sensor unit (13) generates a signal including at least the measurement value (Tm2) of the ambient temperature sensor (13b), and transmits the generated signal by radio. The transmitter (13c) is configured to communicate with the receiver unit (63) once every predetermined time period (e.g., once every 10 seconds). The transmitter (13c) is configured so as to be prevented from transmitting the signal of the measurement value (Tm2) of the ambient temperature sensor (13b) to the receiver unit (63) if the difference between the temperature transmitted last time and the currently detected temperature is small (e.g., if the difference is 0.05° C. or less). The wireless temperature sensor unit (13) is configured to, when the remaining power of a built-in battery decreases to a low level, stop the transmission of the measurement value (Tm2) of the ambient temperature sensor (13b) and allow a built-in LED or built-in LEDs (not shown) to blink.

—Configuration of Indoor Unit—

Figure 3:
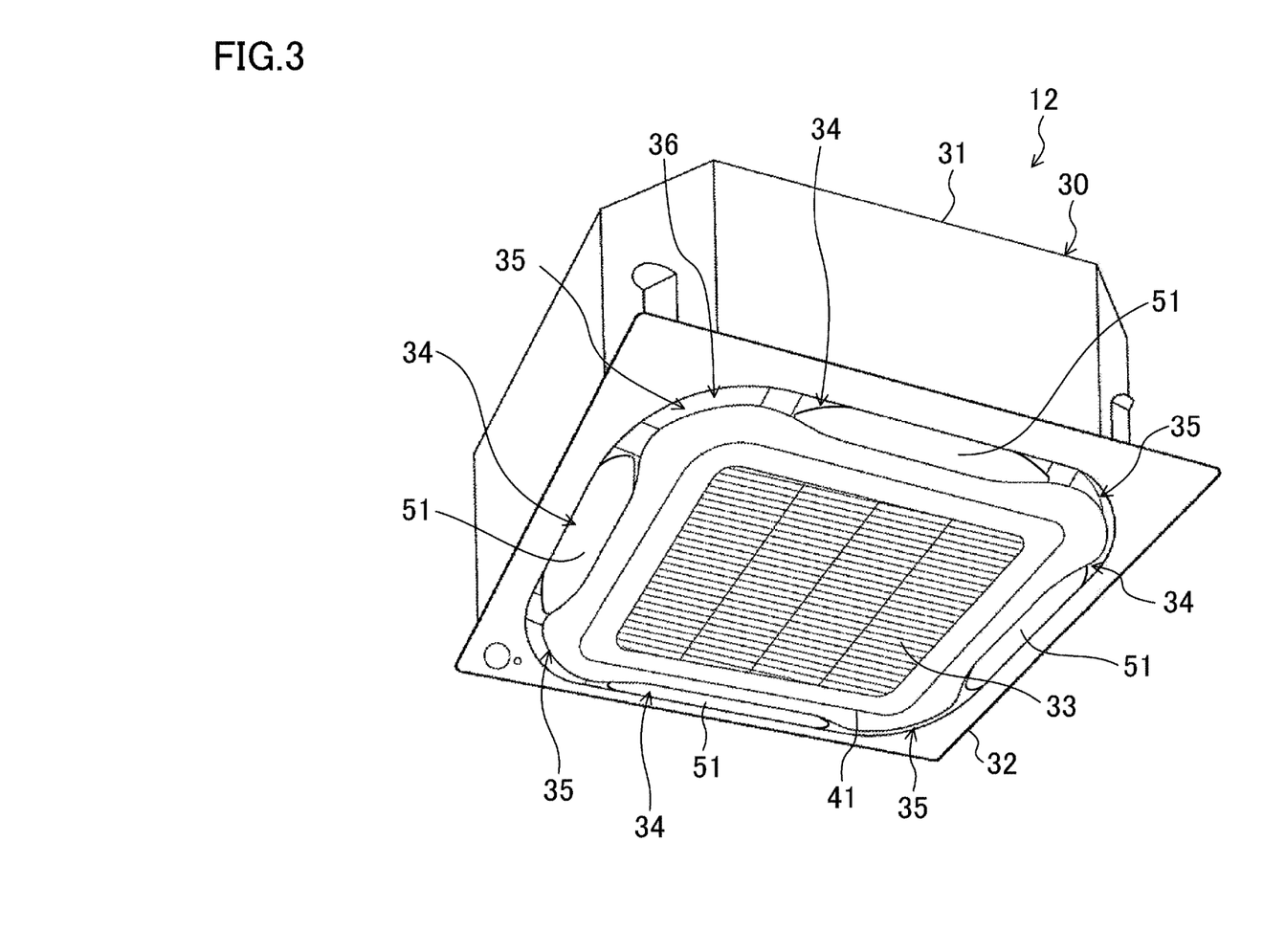
FIG. 3 is a perspective view of an indoor unit viewed obliquely from below.

As shown in FIGS. 1 to 3, the indoor unit (12) includes a casing (30). The casing (30) is provided on a ceiling (501) of the indoor space (500). The casing (30) is comprised of a casing body (31) and a decorative panel (32). The casing (30) houses the indoor fan (27) and the indoor heat exchanger (26). The casing (30) further houses a suction air temperature sensor (61), the receiver unit (63), and an indoor controller (66).

The casing body (31) is mounted by being inserted in an opening in the ceiling (501) of the indoor space (500). The casing body (31) has a generally rectangular parallelepiped box-like shape with its lower end open.

The indoor fan (27) is a centrifugal blower which draws air from below and expels the air radially outward. The indoor fan (27) is arranged at the center in the casing body (31).

The indoor heat exchanger (26) is a so-called cross-fin-type fin-and-tube heat exchanger. The air expelled by the indoor fan (27) passes through the indoor heat exchanger (26). The indoor heat exchanger (26) allows the air passing through the indoor heat exchanger (26) to exchange heat with the refrigerant in the refrigerant circuit.

The decorative panel (32) is a resinous member formed into a thick rectangular plate-like shape. A lower portion of the decorative panel (32) is in a square shape slightly larger than the casing body (31). The decorative panel (32) is arranged to cover the lower end of the casing body (31). The lower surface of the decorative panel (32) serves as a lower surface of the casing (30) and is exposed to the indoor space (500).

As illustrated in FIG. 3, the decorative panel (32) includes a central section having a square inlet opening (33). The inlet opening (33) passes through the decorative panel (32) in the vertical direction and communicates with the interior of the casing (30). The inlet opening (33) is provided with a grid-like intake grille (41).

The decorative panel (32) includes a generally rectangular annular air outlet (36) surrounding the inlet opening (33). As illustrated in FIG. 3, the air outlet (36) is divided into four main outlet openings (34) and four auxiliary outlet openings (35).

The main outlet openings (34) are narrow openings disposed along the four sides of the decorative panel (32). Each side of the decorative panel (32) is provided with one main outlet opening. Each of the auxiliary outlet openings (35) is in the shape of a quarter of a circle. The auxiliary outlet openings (35) are disposed at the four corners of the decorative panel (32). Each corner of the decorative panel (32) is provided with one auxiliary outlet opening.

As illustrated in FIG. 3, each main outlet opening (34) is provided with an airflow direction adjusting flap (51). The airflow direction adjusting flap (51) is a member for adjusting the direction of supply airflow (i.e., the direction of flow of the conditioned air coming from the main outlet openings (34)). The airflow direction adjusting flap (51) changes the direction of supply airflow upward and downward. That is, the airflow direction adjusting flap (51) changes the direction of supply airflow such that the angle between the direction of supply airflow and the horizontal direction changes.

<Suction Air Temperature Sensor>

Figure 4:
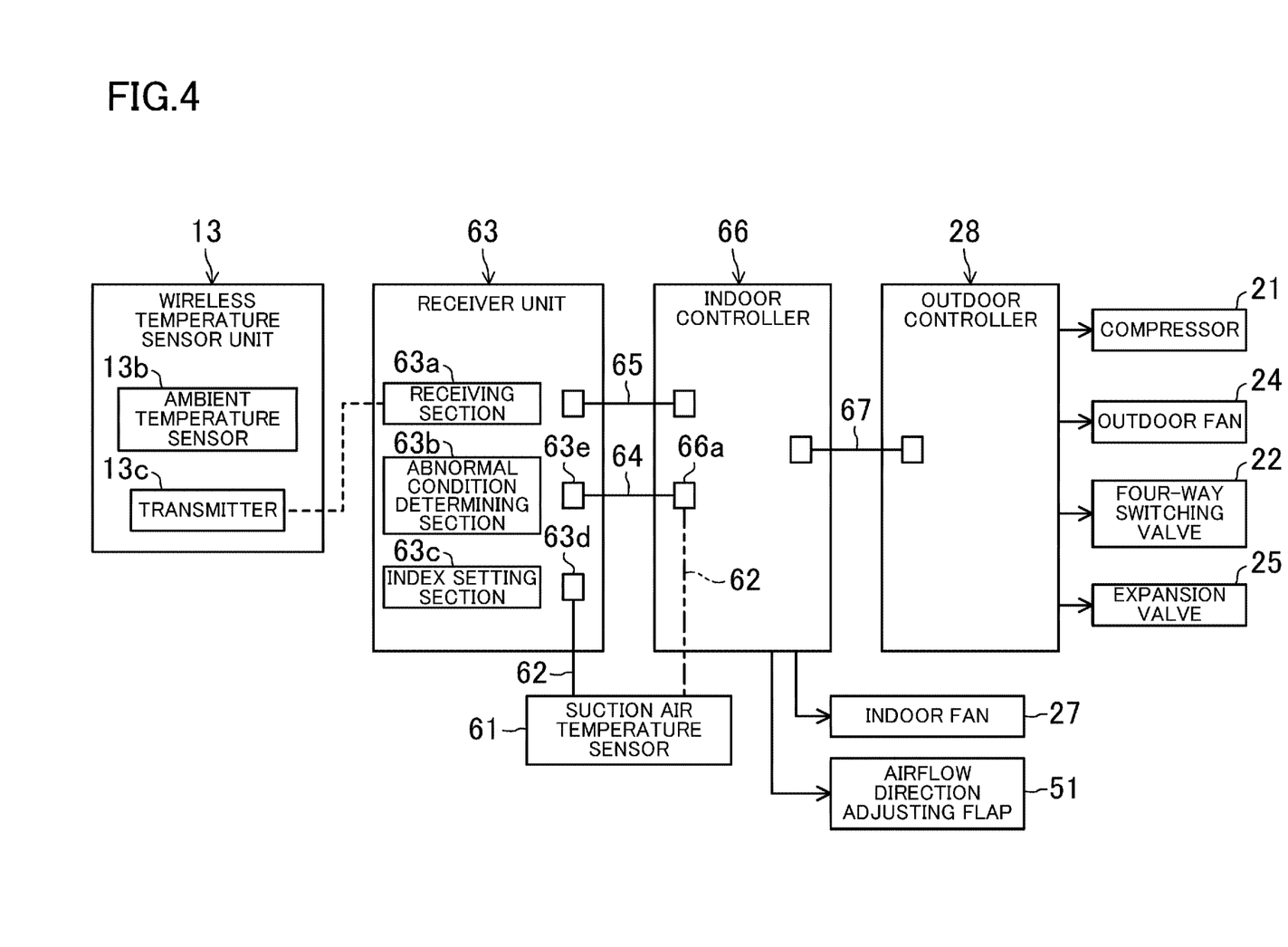
FIG. 4 schematically shows configurations of components of the air-conditioning device.

The suction air temperature sensor (61) is configured to measure the temperature of indoor air drawn into the casing (30) through the inlet opening (33). The suction air temperature sensor (61) is connected to an input connector (63d) of the receiver unit (63) through a sensor signal line (62) as shown in FIG. 4. The input connector (63d) is configured as, for example, a general-purpose connector.

<Receiver Unit>

As shown in FIG. 4, the receiver unit (63) includes the input connector (63d), which is connected to the sensor signal line (62) extending from the suction air temperature sensor (61) as described above. The receiver unit (63) is configured to receive a signal of a measurement value (Tm1) of the suction air temperature sensor (61) from the suction air temperature sensor (61) by wire.

As shown in FIG. 4, the receiver unit (63) includes a receiving section (63a), an abnormal condition determining section (63b), and an index setting section (63c). The receiver unit (63) is configured to transmit a signal of a temperature index value set by the index setting section (63c) to the indoor controller (66).

As shown in FIG. 4, the receiver unit (63) includes an output connector (63e), which is connected to one end of a control signal line (64). The other end of the control signal line (64) is connected to a common input connector (66a) of the indoor controller (66). The output connector (63e) and the control signal line (64) form a signal output section to output a signal generated by the abnormal condition determining section (63b) and the index setting section (63c) to the indoor controller (66).

The receiver unit (63) is connected to the indoor controller (66) through a power line (65), and is further configured to receive power from the indoor controller (66) through the power line (65).

Note that the receiver unit (63) includes a plurality of LEDs (not shown). The receiver unit (63) is configured to change the mode in which the LEDs blink between a case where the wireless temperature sensor unit (13) is broken and a case where the receiver unit (63) is broken. The receiver unit (63) is configured to, if the wireless temperature sensor unit (13) is broken, change the mode in which the LEDs blink in accordance with which of the battery and body of the wireless temperature sensor unit (13) needs to be replaced. The receiver unit (63) is further configured to, if the receiver unit (63) is broken, change the mode in which the LEDs blink in accordance with the type of a component that needs to be replaced.

[Receiving Section]

The receiving section (63a) is configured to receive a signal of the measurement value (Tm2) of the ambient temperature sensor (13b). This signal is transmitted from the wireless temperature sensor unit (13) by radio. The receiving section (63a) transfers the received signal of the measurement value (Tm2) of the ambient temperature sensor (13b) to the abnormal condition determining section (63b).

[Abnormal Condition Determining Section]

The abnormal condition determining section (63b) is configured to determine whether or not the wireless temperature sensor unit (13) is in an abnormal condition, based on the measurement value (Tm1) of the suction air temperature sensor (61) and the measurement value (Tm2) of the ambient temperature sensor (13b).

Figure 5:
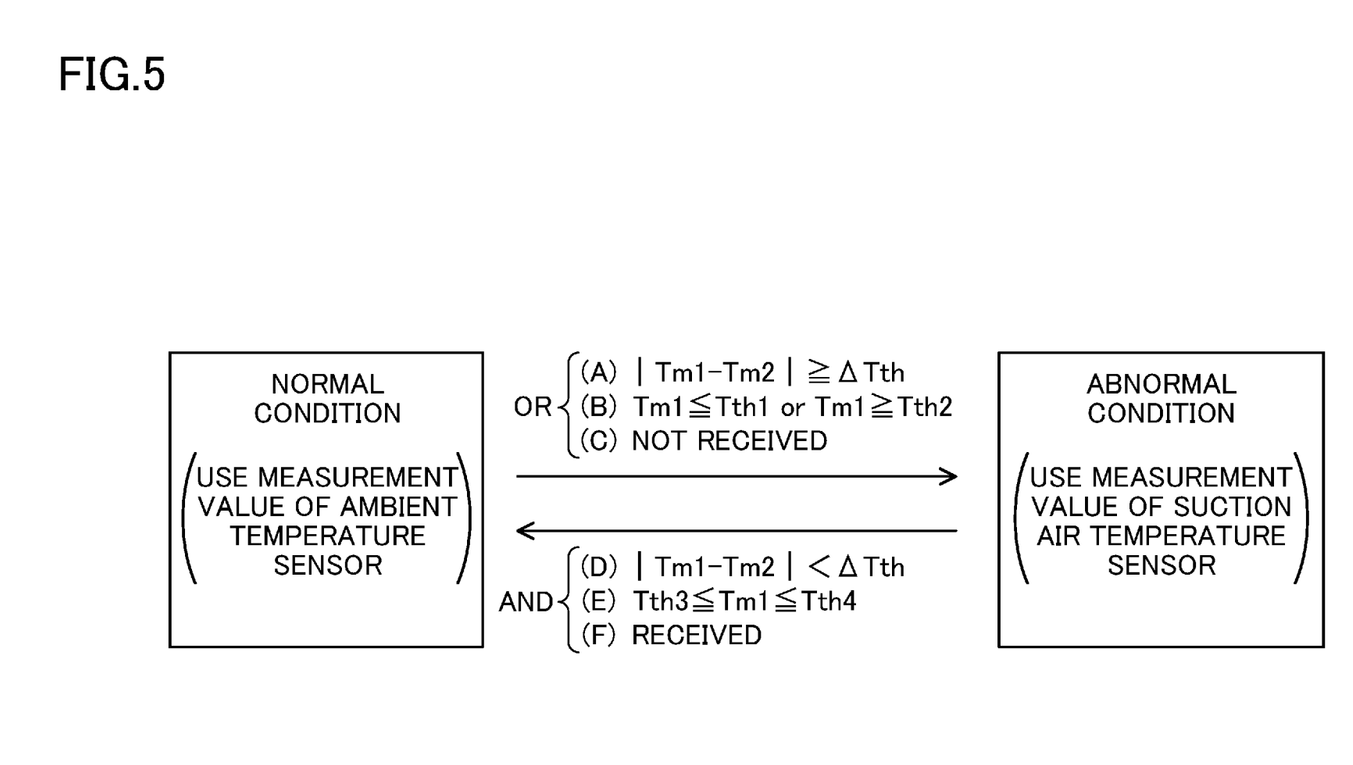
FIG. 5 is a state transition diagram showing how an abnormal condition determining section determines a condition of a wireless temperature sensor unit.

Specifically, as shown in FIG. 5, if at least one of the following three conditions (A) to (C) is satisfied while the wireless temperature sensor unit (13) is in a normal condition, the abnormal condition determining section (63b) determines that the wireless temperature sensor unit (13) is in an abnormal condition. Specifically, the condition (A) indicates a condition where the absolute value of the difference between the measurement value (Till 1) of the suction air temperature sensor (61) and the measurement value (Tm2) of the ambient temperature sensor (13b) is greater than or equal to a predetermined temperature difference threshold ($\Delta$Tth). The condition (B) indicates a condition where the measurement value (Tm1) of the suction air temperature sensor (61) is less than or equal to a predetermined first temperature threshold (Tth1) or greater than or equal to a predetermined second temperature threshold (Tth2). However, the second temperature threshold (Tth2) is greater than the first temperature threshold (Tth1) (Tth1<Tth2). The condition (C) indicates a condition where the receiver unit (63) has received no signal from the wireless temperature sensor unit (13). On the other hand, if none of the conditions (A) to (C) is satisfied, the abnormal condition determining section (63b) determines that the wireless temperature sensor unit (13) is in a normal condition.

In this case, when the condition (A) is satisfied, a determination can be made that the wireless temperature sensor unit (13) is in an abnormal condition for the following reason. Specifically, the suction air temperature sensor (61) measures the temperature of air actually drawn into the casing (30) of the indoor unit (12). That is why the measurement value (Tm1) of the suction air temperature sensor (61) is less likely to differ significantly from the actual room temperature. Meanwhile, the wireless temperature sensor unit (13) may be arranged near any other heater, in the sunshine near a window, or at any other similar location. In this case, the measurement value (Tm2) of the ambient temperature sensor (I3b) differs significantly from the actual room temperature. Thus, if the measurement value (Tm1) of the suction air temperature sensor (61) differs significantly from the measurement value (Tm2) of the ambient temperature sensor (13b), a determination can be made that the wireless temperature sensor unit (13) is in an abnormal condition.

If the condition (B) is satisfied, a determination can be made that the wireless temperature sensor unit (13) is in an abnormal condition for the following reason. Specifically, for example, if the wireless temperature sensor unit (13) is installed at a location having a temperature significantly different from the room temperature in the entire indoor space (500), the measurement value (Tm2) of the ambient temperature sensor (13b) is significantly different from the room temperature in the entire indoor space (500). If, in this state, air is conditioned based on the measurement value of the ambient temperature sensor (3b), the temperature of air in the entire indoor space (500) becomes excessively low or high. This results in that the measurement value (Tm1) of the suction air temperature sensor (61) becomes excessively low or high. Thus, if the measurement value (Tm1) of the suction air temperature sensor (61) is excessively low or high, a determination can be made that the wireless temperature sensor unit (13) is in an abnormal condition.

If the condition (C) is satisfied, a determination can be made that the wireless temperature sensor unit (13) is in an abnormal condition for the following reason. Specifically, for example, if the wireless temperature sensor unit (13) cannot transmit a signal due to a power shortage, the receiver unit (63) cannot receive a signal from the wireless temperature sensor unit (13). In addition, moving the wireless temperature sensor unit (13) out of the room by mistake, for example, may prevent a signal from the wireless temperature sensor unit (13) from reaching the receiver unit (63). For these reasons, if the receiver unit (63) has received no signal from the wireless temperature sensor unit (13), a determination can be made that the wireless temperature sensor unit (13) is in an abnormal condition.

As shown in FIG. 5, if all of the following three conditions (D) to (F) are satisfied while the wireless temperature sensor unit (13) is in an abnormal condition, the abnormal condition determining section (63b) determines that the wireless temperature sensor unit (13) is in a normal condition. Specifically, the condition (D) indicates a condition where the absolute value of the difference between the measurement value (Tm1) of the suction air temperature sensor (61) and the measurement value (Tm2) of the ambient temperature sensor (13b) is less than the predetermined temperature difference threshold (ΔTth). The condition (E) indicates a condition where the measurement value (Tm1) of the suction air temperature sensor (61) is greater than or equal to a predetermined third temperature threshold (Tth3) and less than or equal to a predetermined fourth temperature threshold (Tth4). However, the third temperature threshold (Tth3) is slightly greater than the first temperature threshold (Tth1) and less than the second temperature threshold (Tth2). The fourth temperature threshold (Tth4) is slightly less than the second temperature threshold (Tth2) and greater than the third temperature threshold (Tth1<Tth3<<Tth4<Tth2). The condition (F) indicates a condition where the receiver unit (63) has received a signal from the wireless temperature sensor unit (13). On the other hand, if at least one of the conditions (D) to (F) is not satisfied, the abnormal condition determining section (63b) determines that the wireless temperature sensor unit (13) is still in an abnormal condition.

[Index Setting Section]

The index setting section (63c) is configured to generate a signal serving as an index of indoor temperature, based on the measurement value (Tm2) of the ambient temperature sensor (13b) and the measurement value (Tm1) of the suction air temperature sensor (61). The index setting section (63c) determines either the measurement value (Tm1) of the suction air temperature sensor (61) or the measurement value (Tm2) of the ambient temperature sensor (13b) to be a temperature index value, based on the result determined by the abnormal condition determining section (63b). Specifically, while the abnormal condition determining section (63b) determines that the wireless temperature sensor unit (13) is in an abnormal condition, the index setting section (63c) determines the measurement value (Tm1) of the suction air temperature sensor (61) to be the temperature index value. On the other hand, while the abnormal condition determining section (63b) determines that the wireless temperature sensor unit (13) is not in an abnormal condition, the index setting section (63c) determines the measurement value (Tm2) of the ambient temperature sensor (13b) to be the temperature index value. Note that even while the abnormal condition determining section (63b) determines that the wireless temperature sensor unit (13) is not in an abnormal condition, the index setting section (63c) may determine the measurement value (Tm1) of the suction air temperature sensor (61) to be the temperature index value in some cases. The index setting section (63c) constitutes a signal generator.

<Indoor Controller>

The indoor controller (66) is separate from the receiver unit (63). The indoor controller (66) controls the rotational speed of the indoor fan (27), the orientations of the airflow direction adjusting flaps (51), and other elements, based on the measurement value (Tm1) of the suction air temperature sensor (61) or the measurement value (Tm2) of the ambient temperature sensor (13b) which has been transmitted from the receiver unit (63).

The indoor controller (66) includes the common input connector (66a) having the same shape as the input connector (63d). The common input connector (66a) is selectively connectable to the control signal line (64) and the sensor signal line (62). The common input connector (66a) is configured as, for example, a connector identical to the connector constituting the input connector (63d). If none of the wireless temperature sensor unit (13) and the receiver unit (63) is provided, the sensor signal line (62) of the suction air temperature sensor (61) is connected to the common input connector (66a) as indicated by the chain double-dashed line shown in FIG. 4. In this state, the signal of the measurement value (Tm1) of the suction air temperature sensor (61) is directly fed to the indoor controller (66).

As shown in FIG. 4, the indoor controller (66) is connected to the outdoor controller (28) through a connection signal line (67). The indoor controller (66) is configured to transmit, to the outdoor controller (28), a signal of the temperature index value transmitted from the receiver unit (63).

The outdoor controller (28) controls the rotational speed of the compressor (21) based on the signal of the temperature index value received from the indoor controller (66), and performs other suitable operations. For example, during a cooling operation, if the temperature index value is higher than a target temperature, the outdoor controller (28) increases the rotational speed of the compressor (21), whereas if the temperature index value is lower than the target temperature, the outdoor controller (28) reduces the rotational speed of the compressor (21). For example, during a heating operation, if the temperature index value is lower than a target temperature, the outdoor controller (28) increases the rotational speed of the compressor (21), whereas if the temperature index value is higher than the target temperature, the outdoor controller (28) reduces the rotational speed of the compressor (21).

As described above, if no receiver unit (63) is provided, the sensor signal line (62) extending from the suction air temperature sensor (61) is connected to the common input connector (66a). In this case, the measurement value (Tm1) of the suction air temperature sensor (61) is transferred from the indoor controller (66) to the outdoor controller (28), which controls the compressor (21) and other components using the measurement value (Tm1) of the suction air temperature sensor (61). That is to say, in this case, the outdoor controller (28) controls the rotational speed of the compressor (21) as described above, using the measurement value (Tm1) of the suction air temperature sensor (61) as the temperature index value.

The indoor controller (66) may be integrated with the receiver unit (63). The indoor controller (66) and the outdoor controller (28) constitute a controller.

—Operation—

Flow the air-conditioning device (10) operates will now be described below. If a heating operation or a cooling operation is to be performed, the compressor (21), the outdoor fan (24), and the indoor fan (27) are driven. In this manner, the refrigerant circuit (20) allows a refrigerant to circulate therethrough to perform a vapor compression refrigeration cycle. Thus, the cooling operation, the heating operation, or any other operation is performed. In this case, during the cooling operation, switching the four-way switching valve (22) allows the outdoor heat exchanger (23) to function as a radiator (condenser), and allows the indoor heat exchanger (26) to function as an evaporator. On the other hand, during the heating operation, switching the four-way switching valve (22) allows the indoor heat exchanger (26) to function as a radiator (condenser), and allows the outdoor heat exchanger (23) to function as an evaporator.

Here, during operation of the indoor unit (12), rotation of the indoor fan (27) allows air in the indoor space (500) to flow through the inlet opening (33) into the casing (30). The air that has flowed into the casing (30) is drawn into the indoor fan (27), and expelled into the indoor heat exchanger (26). The air expelled through the indoor fan (27) is cooled or heated while passing through the indoor heat exchanger (26), and is expelled through the four main outlet openings (34) and the four auxiliary outlet opening (35) into the indoor space (500).

In the indoor unit (12) performing a cooling operation, the indoor heat exchanger (26) functions as an evaporator to cool the air passing through the indoor heat exchanger (26). On the other hand, in the indoor unit (12) performing a heating operation, the indoor heat exchanger (26) functions as a condenser to heat the air passing through the indoor heat exchanger (26).

The indoor unit (12) is configured to expel conditioned air into the indoor space (500) such that the temperature of air in the indoor space (500) is equal to a predetermined target temperature. Here, the indoor controller (66) controls components of the indoor unit (12) based on the temperature index value set by the index setting section (63c). For example, the indoor controller (66) controls the rotational speed of the indoor fan (27) to control the flow rate of conditioned air expelled into the indoor space (500). The indoor controller (66) individually controls the positions of the four airflow direction adjusting flaps (51) to control the direction in which the conditioned air is expelled.

The outdoor controller (28) controls components of the outdoor unit (11) based on the temperature index value set by the index setting section (63c). The outdoor controller (28) controls, for example, the rotational speed of the compressor (21) to regulate the heating or cooling capacity of the air-conditioning device (10). The outdoor controller (28) further controls the rotational speed of the outdoor fan (24), switching of the four-way switching valve (22), the degree of opening of the expansion valve (25), and other elements.

During the heating operation, a downward blowing operation in which conditioned warm air is blown substantially downward, a horizontal blowing operation in which conditioned warm air is blown substantially horizontally, or any other operation is performed. On the other hand, during the cooling operation, a swinging operation in which conditioned air having a relatively low temperature is blown while the airflow direction adjusting flaps (51) are swung substantially between the horizontal direction and the downward direction, a horizontal blowing operation in which conditioned air having a relatively low temperature is blown substantially horizontally, or any other operation is performed.

Advantages of Embodiment

In the air-conditioning device (10) of this embodiment, the receiver unit (63) receives both of the measurement value (Tm2) of the ambient temperature sensor (13b) of the wireless temperature sensor unit (13) and the measurement value (Tm1) of the suction air temperature sensor (61). The index setting section (63c) of the receiver unit (63) determines a single temperature index value based on both of the received measurement values (Tm1, Tm2). The indoor controller (66) and the outdoor controller (28) control components such as the compressor (21), based on the determined single temperature index value. Here, the indoor controller (66) receives only the single temperature index value without receiving both the measurement value (Tm2) of the ambient temperature sensor (13b) and the measurement value (Tm1) of the suction air temperature sensor (61). Thus, both of the wireless temperature sensor unit (13) and the suction air temperature sensor (61) can be used to control operation of the air-conditioning device (10) without changing the configuration of the existing indoor controller (66) designed on the precondition that the indoor controller (66) receives only one index of indoor temperature.

To mount the receiver unit (63) in the indoor unit (12), the configuration of the existing indoor controller (66) does not have to be changed. Specifically, when the receiver unit (63) is mounted in the indoor unit (12), the sensor signal line (62) is removed from the common input connector (66a) of the indoor controller (66), the removed sensor signal line (62) is connected to the input connector (63d) of the receiver unit (63), and the control signal line (64) of the receiver unit (63) is connected to the common input connector (66a). This allows signals of the measurement values (Tm1, Tm2) of both of the suction air temperature sensor (61) and the ambient temperature sensor (13b) to be fed to the receiver unit (63). Thus, the receiver unit (63) can be mounted in the indoor unit (12) without changing the configuration of the existing indoor controller (66).

Other Embodiments

In the foregoing embodiment, one end of the control signal line (64) is connected to the output connector (63e). However, this is merely an example. For example, the one end of the control signal line (64) may be bonded to a substrate of the receiver unit (63) by soldering or any other process.

In the foregoing embodiment, the air-conditioning device (10) includes only one indoor unit (12). However, the air-conditioning device (10) may include two or more indoor units (12).

In the foregoing embodiment, not only the main outlet openings (34) but also the auxiliary outlet openings (35) are provided. However, the auxiliary outlet openings (35) do not have to be provided.

In the foregoing embodiment, the indoor unit (12) is configured to expel conditioned air in four directions. However, the indoor unit (12) may be configured to expel conditioned air, for example, in one or two directions.

The indoor unit (12) may be not a ceiling-embedded indoor unit embedded in the opening of the ceiling (501), but a ceiling-hanging indoor unit having the casing (30) hung from the ceiling (501), a wall-mounted indoor unit, or a floor-mounted indoor unit.

In the foregoing embodiment, the index setting section (63c) determines either the measurement value (Tm1) of the suction air temperature sensor (61) or the measurement value (Tm2) of the ambient temperature sensor (13b) to be a temperature index value, based on the result determined by the abnormal condition determining section (63b). However, this is merely an example. The index setting section (63c) may be configured to generate the temperature index value based on, for example, the result obtained by performing an operation on the measurement value (Tm1) of the suction air temperature sensor (61) and the measurement value (Tm2) of the ambient temperature sensor (13b) (e.g., the average of these values).

INDUSTRIAL APPLICABILITY

As can be seen from the foregoing description, the present invention is useful as a receiver and an air-conditioning device including the same.

DESCRIPTION OF REFERENCE CHARACTERS

10 Air-Conditioning Device
12 Indoor Unit
13 Wireless Temperature Sensor Unit
21 Compressor (Component)
27 Indoor Fan (Component)
28 Outdoor Controller (Controller)
61 Suction Air Temperature Sensor
62 Sensor Signal Line
63 Receiver Unit (Receiver)
63a Receiving Section
63c Index Setting Section (Signal Generator)
63d Input Connector
63e Output Connector (Signal Output Section)
64 Control Signal Line (Signal Output Section)
66 Indoor Controller (Controller)
66a Common Input Connector
500 Indoor Space

The invention claimed is:

1. A receiver for an air-conditioning device, the receiver being provided for an indoor unit of the air-conditioning device, the receiver comprising:
   a receiving section receiving a signal of a measurement value transmitted from a wireless temperature sensor unit by radio, the wireless temperature sensor unit measuring an ambient temperature and being separate from the indoor unit;
   an input connector connected to a sensor signal line, the sensor signal line being configured to transfer a signal of a measurement value of a suction air temperature sensor, the suction air temperature sensor measuring a temperature of indoor air drawn into the indoor unit;
   a signal generator generating a signal serving as an index of indoor temperature, based on the measurement values of the wireless temperature sensor unit and the suction air temperature sensor; and
   a signal output section outputting the signal generated by the signal generator to a controller of the air-conditioning device, wherein
   the signal output section includes a control signal line connectable to a temperature sensor connector instead of the suction air temperature sensor, the temperature sensor connector being provided for the controller of the air-conditioning device to connect the suction air temperature sensor.

2. An air-conditioning device comprising:
   an indoor unit;
   a suction air temperature sensor provided for the indoor unit to measure a temperature of indoor air drawn into the indoor unit;
   a controller performing a control operation;
   a receiver including
      a receiving section measuring an ambient temperature and receiving a signal of a measurement value (Tm2), the measurement value (Tm2) being transmitted from a wireless temperature sensor unit separate from the indoor unit by radio,
      an input connector connected to a sensor signal line, the sensor signal line being configured to transfer a signal of a measurement value (Tm1) of the suction air temperature sensor,
      a signal generator generating a signal serving as an index of indoor temperature, based on the measurement values (Tm1, Tm2) of the wireless temperature sensor unit and the suction air temperature sensor, and
      a signal output section outputting the signal generated by the signal generator to the controller, the receiver being provided for the indoor unit; and
   a component controlled by the control operation of the controller, wherein
   the controller receives the signal generated by the signal generator and performs the control operation using the received signal, and
   the receiver is separate from the controller, and is housed in a casing of the indoor unit together with the controller.

3. An air-conditioning device comprising:
   an indoor unit;
   a suction air temperature sensor provided for the indoor unit to measure a temperature of indoor air drawn into the indoor unit;
   a controller performing a control operation;
   a receiver including
      a receiving section measuring an ambient temperature and receiving a signal of a measurement value (Tm2), the measurement value (Tm2) being transmitted from a wireless temperature sensor unit separate from the indoor unit by radio,
an input connector connected to a sensor signal line, the sensor signal line being configured to transfer a signal of a measurement value (Tm1) of the suction air temperature sensor,
a signal generator generating a signal serving as an index of indoor temperature, based on the measurement values (Tm1, Tm2) of the wireless temperature sensor unit and the suction air temperature sensor, and
a signal output section outputting the signal generated by the signal generator to the controller, the receiver being provided for the indoor unit; and
a component controlled by the control operation of the controller, wherein
the controller receives the signal generated by the signal generator and performs the control operation using the received signal,
the controller includes a common input connector having a shape identical to that of the input connector, the common input connector being connectable to a selected one of the signal output section and the sensor signal line.

* * * * *